United States Patent [19]
Coleman et al.

[11] Patent Number: 5,891,511
[45] Date of Patent: Apr. 6, 1999

[54] ADDITION OF COLOR TO ELECTROCHROMIC DISPLAYS

[75] Inventors: James Patrick Coleman, Maryland Heights; Anne T. Lynch, Chesterfield, both of Mo.

[73] Assignee: Monsanto Company, St. Louis, Mo.

[21] Appl. No.: 721,105

[22] Filed: Sep. 26, 1996

Related U.S. Application Data

[60] Provisional application No. 60/009,226 Dec. 26, 1995.

[51] Int. Cl.$^6$ ...................................................... B05D 5/06
[52] U.S. Cl. ............................ 427/64; 427/162; 427/165; 427/106; 427/108; 427/404; 427/419.1
[58] Field of Search .................................. 427/162, 165, 427/108, 106, 64, 404, 419.1

[56] References Cited

U.S. PATENT DOCUMENTS

| | | | |
|---|---|---|---|
| 3,819,252 | 6/1974 | Giglia | 350/160 R |
| 3,892,472 | 7/1975 | Giglia | 350/160 R |
| 3,978,007 | 8/1976 | Giglia et al. | 252/506 |
| 4,160,241 | 7/1979 | Shimizu et al. | 340/763 |
| 4,280,754 | 7/1981 | Yano et al. | 350/357 |
| 4,342,031 | 7/1982 | Lapeyre | 340/756 |
| 4,354,741 | 10/1982 | Mano et al. | 350/357 |
| 4,465,339 | 8/1984 | Baucke et al. | 350/357 |
| 4,550,982 | 11/1985 | Hirai | 350/357 |
| 4,596,722 | 6/1986 | Warzawski | 427/108 |
| 4,652,090 | 3/1987 | Uchikawa et al. | 350/357 |
| 4,746,200 | 5/1988 | Kamigaki | 350/357 |
| 4,750,817 | 6/1988 | Sammels | 350/357 |
| 4,810,067 | 3/1989 | Demiryont | 350/357 |
| 4,824,221 | 4/1989 | Endo et al. | 350/357 |
| 4,893,903 | 1/1990 | Thaker et al. | 350/331 |
| 4,902,110 | 2/1990 | Green | 350/357 |
| 4,966,675 | 10/1990 | Steininger | 209/490 |
| 5,011,582 | 4/1991 | Oshikawa et al. | 204/140 |
| 5,078,480 | 1/1992 | Warszawski | 359/265 |
| 5,104,583 | 4/1992 | Richardson | 252/518 |
| 5,189,549 | 2/1993 | Leventis et al. | 359/271 |
| 5,216,536 | 6/1993 | Agrawal et al. | 359/274 |
| 5,227,252 | 7/1993 | Murayama et al. | 428/690 |
| 5,413,739 | 5/1995 | Coleman | 252/511 |
| 5,442,478 | 8/1995 | Lampert et al. | 359/273 |
| 5,500,759 | 3/1996 | Coleman | 359/270 |

FOREIGN PATENT DOCUMENTS

| | | |
|---|---|---|
| 9669923 | 4/1975 | Canada . |
| 1154135 | 6/1983 | Canada . |
| 0 132 068 A | 1/1985 | European Pat. Off. . |
| 0193978 | 9/1986 | European Pat. Off. . |
| 0341554 | 11/1989 | European Pat. Off. . |
| 0403180 | 12/1990 | European Pat. Off. . |
| 0486387 | 5/1992 | European Pat. Off. . |
| 0 592 328 A | 4/1994 | European Pat. Off. . |
| 53-042055 A | 4/1978 | Japan . |
| 59-113422 | 6/1984 | Japan . |
| 0226064 | 12/1984 | Japan . |
| 0099174 | 6/1985 | Japan . |
| 0229964 | 11/1985 | Japan . |
| 61-223724 A | 10/1986 | Japan . |
| 62-044719 | 2/1987 | Japan . |
| 62-049333 | 3/1987 | Japan . |
| 63-199325 | 8/1988 | Japan . |
| 63-199325 A | 8/1988 | Japan . |
| 63-207856 | 8/1988 | Japan . |
| 1107135 | 4/1989 | Japan . |
| 3275658 | 11/1989 | Japan . |
| 61-185730 | 8/1996 | Japan . |
| WO 87/01515 | 3/1987 | WIPO . |
| WO 92/18896 | 10/1992 | WIPO . |
| Wo 92/19694 | 11/1992 | WIPO . |
| WO 93/21557 | 10/1993 | WIPO . |
| WO 93/21558 | 10/1993 | WIPO . |
| WO 93/22707 | 11/1993 | WIPO . |
| WO 94/15246 | 7/1994 | WIPO . |

OTHER PUBLICATIONS

Nomura et al., J. Macromol. Sci.–Chem., A26(2&3), pp. 593–608 (1989), Electrochemical and Electrochromic Properties of Polymer Complex Films Composed of Polytetramethyleneviologen and Poly–[p–styrenesulfonic Acid] Containing a Conductive Powder (no mo.).

Masumi, Proc. of SID 1982, vol. 23/4, pp. 245–248, "Response–Improved Electrochromic Display Based on Organic Materials" (no mo.).

Orel et al., J. Electrochem. Soc. vol. 141, No. 9, pp. L127–L130, Sep., 1994, "Electrochemical and Structural Properties of $SnO_2$ and $Sb:SnO_2$ Transparent Electrodes with Mixed Electronically Conductive and Ion–Storage Characteristics".

Primary Examiner—Janyce Bell
Attorney, Agent, or Firm—Howell & Haferkamp, L.C.

[57] ABSTRACT

Disclosed herein is a method of enhancing colors displayed by an electrochromic display. The method involves incorporating an inert pigment into the display.

14 Claims, 1 Drawing Sheet

ADDITION OF COLOR TO ELECTROCHROMIC DISPLAYS

This application claims benefits under 35 U.S.C. § 119(e) of U.S. provisional application Ser. No. 60/009,226, entitled "Electrochromic Tin Oxide," which was filed on Dec. 26, 1995.

BACKGROUND OF THE INVENTION

1. Field of the invention

This invention relates to an electrochromic display device and to methods for producing same, and more particularly to electrochromic display devices, methods, and compositions for electrochromic devices with greatly enhanced color rendition.

2. Description of the Prior Art

Laminate electrochromic displays are known, such as those described in U.S. Pat. No. 5,413,739, the disclosure of which is incorporated in its entirety by reference. Some known techniques of fabricating electrochromic displays involve side-by-side electrodes, such as illustrated in FIG. 1, wherein a nonconductive substrate A is coated with a conductive layer B of a plurality of electrodes such as metal, metal oxide, conductive polymer, or carbon. An additional layer $C_1$ is coated on top layers B and A, and comprises an electrically conductive, essentially ionically isolative, electrochromic composite layer comprising a dispersion of electrically conductive, electrochromic particles dispersed in a polymer matrix, e.g., titanium dioxide particles coated with ATO (antimony-doped tin oxide) dispersed in a rubber matrix. Layer D is an ionically conductive layer, e.g., an aqueous polymeric gel such as polyacrylamidomethylpropanesulfonate (known as POLYAMPS) gel, while layer F is a transparent, insulating layer such as a polyethylene terephthalate (PET) film, that serves to prevent loss of electrolyte from the conductive layer. Because the conductivity of the electrochromic composite layer $C_1$ is lower than the conductivity of the ionically conductive layer D, current will preferentially flow from one electrode through the electrochromic layer to the second electrode. Where the electrochromic material changes color with the loss of an anion, the electrochromic effect will be visible over one electrode. Where the electrochromic material changes color with both the gain and loss of an anion, e.g., as is the case with polyaniline, electrochromic effects will be visible over both electrodes.

Doped tin oxides are known among metal oxides for their relative transparency and high electrical conductivity. These properties are advantageous employed in a variety of electro-optical applications, e.g., providing transparent conductive coatings on particles or surfaces. One such application is the fabrication of transparent electrodes on electrochromic display devices which typically have an electrolyte material in contact with an electrochromic material so that an electrochromic effect is generated when an electric potential is applied across the interface of the two materials. When electrodes are provided on both sides of the materials, e.g., in sandwich-like structure, the electrode on at least one side of the display laminate needs to be relatively transparent to permit observation of the electrochromic effect. In such devices, typical electrochromic materials include tungsten oxide, Prussian blue, polyaniline and viologens. Transparent electrodes have been fabricated by vapor deposition of doped tin oxide coatings on glass or plastic substrates. Although doped tin oxides have been employed as transparent conductors in electrochromic devices, it appears that the possibility that doped tin oxide might be useful as a practical electrochromic material has not been discovered. For example, Orel et al. reported in the Journal of the Electrochemical Society, Vol. 141, page L127 (1994) that a film of ATO exhibited a change in light reflectance between the reduced and oxidized state of less than 5% which corresponds to a contrast ratio (as defined hereinbelow) of less than 1.05. Because such a change in color is not readily discernable to the typical human eye, it has not been recognized or discovered that doped tin oxides have useful electrochromic properties.

A variety of dopants are used to make conductive metal oxides, some of which are not known to exhibit any useful electrochromic effect regardless of modification. Similarly, ATO, when provided in film form, also does not exhibit any useful electrochromic effect.

Pigments used in electrochromic displays such as those described above, as well as others having different electrode arrangements, such as sandwich-type displays, wherein electrochromic material is sandwiched between two electrodes, one of which is transparent, have historically had a somewhat limited range of colors. When it has been desired to add color to previous sandwich-type electrochromic displays, an opaque $TiO_2$-containing electrolyte with added color pigments has been used. However, this method is not suitable with electrochromic displays having interdigitated (or side-by-side) electrodes, because the electrolyte must be transparent in order to permit the color-changing substances behind it to be seen. Therefore, other methods must be used.

BRIEF DESCRIPTION OF THE INVENTION

Surprisingly, it has been discovered that certain of the conductive doped tin oxides can be useful high contrast electrochromic materials. Therefore, this invention provides novel electrochromic materials and comprising doped tin oxide having a high contrast ratio between difference oxidation states, and methods of making such materials. These high contrast electrochromic tin oxide materials are doped with an electrochromically effective amount of a metal that provides a color change when exposed to ion transfer in an electric field. Preferred dopants are antimony and niobium.

This invention also provides methods of making such electrochromic tin oxide materials, for instance in the case of antimony-doped tin oxide materials, by employing higher levels of antimony than commonly used in conductive tin oxide applications.

This invention also provides methods of advantageously using such electrochromic tin oxide materials, e.g., in display devices. More particularly, this invention also provides a method of producing an electrochromic effect by applying an electrochemical potential to doped tin oxide in contact with mobile ions.

This invention also provides particulate antimony-doped tin oxide that is oxidized or reduced to provide a powder resistivity which is at least two times the powder resistivity of a base antimony tin oxide compound. Such resistive antimony-doped tin oxide is also uniquely colored as compared to analogous tin oxides that are highly conductive and transparent.

This invention also provides electrochromic devices comprising such high-contrast, electrochromic tin oxide materials. Such devices are typically laminate structures comprising a layer of electrochromic material in contact with an ion-supplying electrolyte layer.

In another significant aspect of the present invention, it has been found that the addition of nonreactive, electrochemically-inactive (which, for purposes of this specification, may therefore be called "inert") pigments to electrochromic displays having interdigitated electrodes can enhance the visual effect of the display without interfering with the electrochemical reaction that forms the basis for the color change. A basis of the present invention is that the inert pigment may be added to the ink of the display, either as a separate pigment, or as a particle upon which the active electrochromic substance is deposited. The inert pigment may also be added to a layer under the active layer, so that the active layer behaves somewhat as a shutter covering the inert pigment. The inert pigment may also be added directly to the electrolyte itself, provided that it is transparent as well as non-reactive, or it may be added to (or be inherently part of) the laminating film of the display on top of the electrolyte.

It is thus an object of the invention to provide electrochromic materials comprising doped tin oxide having a high contrast ratio between different oxidation states.

It is also an object of the invention to provide methods of making such electrochromic tin-oxide materials.

It is yet another object of the invention to provide advantageous uses of electrochromic tin oxide materials in display devices.

It is a further object of the invention to provide a method of producing an electrochromic effect by applying an electrochemical potential to doped tin oxide in contact with mobile ions.

It is yet another object of the invention to provide particulate, resistive, and uniquely colored antimony-doped tin oxide.

It is still another object of the invention to provide electrochromic devices comprising high-contrast, electrochromic tin oxide materials.

It is yet another object of the invention to provide electrochromic displays having enhanced visual effect without interfering with the electrochemical reaction that forms the basis of the color change.

It is a further object of the invention to provide enhanced color in an electrochromic display by adding nonreactive pigments to the display.

It is yet another object of the invention to provide methods of enhancing the range of colors of interdigitated electrochromic displays.

It is still another object of the invention to provide interdigitated electrochromic displays having greatly enhanced color.

These as well as other objects of the invention will become apparent to one skilled in the art upon reading the detailed description below.

DETAILED DESCRIPTION OF THE INVENTION

Figure 1:
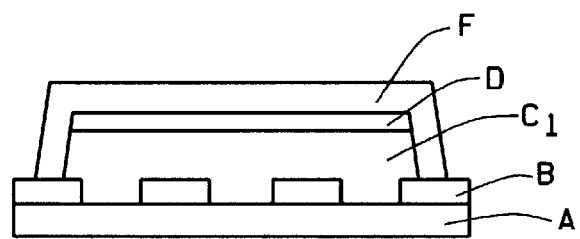
FIG. 1 is an illustration of a laminate electrochromic display comprising a substrate A, conductive electrodes B, an electronically conductive, essentially ionically isolative, electrochromic composite layer $C_1$, an ionically conductive layer D (such as POLYAMPS gel), and a transparent, insulating layer F.

Percentages expressed herein as "%" are mole percent unless indicated otherwise, e.g. weight percent is expressed as "wt %".

As used herein "powder resistivity" means an electrical resistivity measured with a two probe apparatus on powder compressed at high pressure in a confined by defined space. The two probes of the apparatus comprise metal, e.g. stainless steel, rods about 6.5 mm in diameter and extending about 15 mm from the center of a plate, e.g. electrically connected to an ohm-meter. The overall length of the non-conducting, e.g. acrylic polymer, cylinder reinforced by a surrounding metal, e.g. aluminum, sleeve and having a central bore that is slightly larger than the diameter of the rods. To measure powder resistivity, the cylinder is mounted on one disc with the rod inserted into the bore; the open bore is partially filled with particulate material which is compressed by pressing the second rod into the bore. Resistance is measured by an ohm-meter when the pressure on the powder is 845 kilograms per square centimeter (which is equivalent to 12,000 psi). At that pressure the height of compressed particles in the bore ($H_p$) is determined by measuring the space between the discs in centimeters with a micrometer. The cross sectional area of the rod ($A_r$) is 0.3318 square centimeters. Powder resistivity ($\rho$) is determined by multiplying the measured resistance by the ratio of cross sectional area ($A_r$) to height of compressed particles in the bore ($H_p$).

As used herein the terms "oxidized" and "reduced" mean changing the number of electrons associated with a valence state of a material by chemical or electrochemical means. An oxidized metal oxide is a material that has fewer electrons than the same metal oxide material in its natural state. Conversely, a reduced metal oxide is a material that has more electrons than the same metal oxide material in its natural state. A common chemical reducing agent is sodium borohydride which is capable of putting electrons accompanied by ions, e.g. protons or other cations such as sodium, lithium, etc., into a tin oxide lattice. In a reduced state, e.g. when saturated with electrons, doped tin oxide has a darker color and lower conductivity. interestingly, the conductivity of both reduced and oxidized doped tin oxide is significantly lower than the conductivity of doped tin oxide in the natural state. The conductivity of oxidized doped tin oxide is lower because the number of electron carriers is substantially lower. The conductivity of reduced doped tin oxide is lower because the material is so saturated with electrons that electron mobility is impaired. To achieve an electrochromic effect it is believed that it is necessary to cause an electrochromic-generating oxidation or reduction at the surface of the electrochromic material, e.g. typically by applying an electrical potential of 1 volt or less to cause cations and electrons to migrate into or out of the surface layer of the electrochromic material.

As used herein the term "contrast ratio" (CR) describes the difference in color of a material in oxidized and reduced states. More particularly, contrast ratio means the ratio of reflectance of a material in an electrochemically oxidized state to the reflectance of the material in an electrochemically reduced state, where reflectance is a photo diode measurement of the value of light reflected off the oxidized or reduced material from a constant source of light shining on the material. A material having a CR=1 would have no electrochromic effect, that is the light reflected from the material in a reduced state would be immeasurably different from the light reflected from the material in an oxidized state. The electrochromic tin oxide materials used in the electrochromic devices of this invention have a CR of at least 1.2 or higher, say at least 1.4 or 1.6. Preferred electrochromic tin oxide materials of this invention have a CR of at least 1.8 or higher, say at least 2 or 3. More preferred electrochromic tin oxide materials of this invention have a CR of at least 4 of higher, say at least 4.5 or 5.

A material is said to be in an oxidized state when it has fewer electrons than in the reduced state. For instance, in oxides, antimony has two stable oxidation states with two or zero electrons in the outer shell. These are denoted as Sb(III) and Sb(V). In the mixed oxide compound ATO, as naturally formed, the antimony atoms in the metal oxide lattice are at an oxidation state intermediate between III and V with electrons from the antimony in a tin 5S electron orbital based conduction band. In ATO the natural blue grey color is believed to be due to a charge transfer absorption band.

As used herein, a non-reactive, electrochemically inactive (which, for purposes of this specification, may therefore be called "inert") pigment is a pigment that does not react with the chemicals of the electrochromic display of which it is a part, and does not participate in any redox reaction caused by the application of a normal electrochromic switching voltage to the display.

For electrochromic metal oxides, e.g. ATO, the inventors herein have now shown that the wide ranges of color and conductivity in metal oxide powders are possible for a given ratio of dopant to base metal by changing the oxidation state of the material, i.e. changing the number of electrons. For instance, in the case of ATO, the number of delocalized electrons associated with the antimony can be changed by either chemical or electrochemical oxidation or reduction.

In particular, in oxidized ATO electrons are removed from the material effectively transforming the antimony to a species closer to antimony V which has no free electrons and essentially no color; there are no delocalized electrons remaining to undergo charge transfer. Conversely, in reduced ATO there is an increase in delocalized electrons in the metal oxide, resulting in more charge transfer light absorption and hence more color. In a natural state, e.g. without exposure to an electrical potential causing oxidation or reduction, natural ATO has an inherently translucent blue grey color where the intensity and hue of the color is a function of the antimony in the mixed metal oxide.

In describing dopants it is useful to use mole ratios of metal components in the tin oxide material. Unless otherwise indicated, the amount of dopant in a tin oxide will be expressed as a mole ratio. For example, 6% ATO describes tin oxide doped with antimony where the number of moles of antimony as a percent of the combined moles of antimony and tin is 6%.

Factors affecting contrast ratio of a doped tin oxide include the amount of dopant and the covering power, i.e. ability to absorb light, of optional adjuvant materials such as pigmented particles mixed with doped tin oxide particles or providing a substrate for a doped tin oxide coating.

Although doped tin oxide is typically considered transparent or translucent, especially when applied as a film, particular doped tin oxide can have perceptible color, perhaps due at least in part to the interaction of light with the particle. Thus, factors affecting color within the realm of routine experimentation include particle size, amount of dopant, crystallite size and dimensional thickness of the doped tin oxide material. For instance, particles of 10% ATO have what appears to be a dark gray color. While the dark gray-colored, doped tin oxide can be used in electrochromic devices, the contrast is often not optimal since reduced tin oxides generally get darker in color, leaving little room in the chromatic spectrum for adequate contrast in display images. It has been discovered, however, that when doped tin oxide is used in combination with a light-colored pigment substrate, that the lighter color of the pigment imparts a lighter natural color that provides significantly greater contrast when the doped tin oxide is reduced and/or oxidized. Thus, in providing material for use in electrochromic displays, it is often preferred to provide the doped tin oxide with a light-colored adjuvant, e.g. at white or pastel colored pigment, that will provide a light background color visible through a generally transparent or at least translucent, doped tin oxide. The doped tin oxide and pigment can be provided as a mixture of particles. It is preferable to provide the doped tin oxide as a coating on, or in admixture with, a light colored adjuvant substrate. Useful adjuvant pigments include titanium dioxide ($TiO_2$), mica, aluminum borate, silica, barium sulfate and alumina. When doped tin oxide is used in a mixture with pigment particles, the pigment material is preferably less electrochemically active in aqueous electrolytes than is the doped tin oxide. When used with a light colored pigment adjuvant as a substrate for doped tin oxide, the amount of doped tin oxide in the coating is not critical so long as the particle is sufficiently conductive. Unless otherwise indicated, the relative amounts of doped tin oxide and pigment will be expressed as weight ratio, e.g. a weight ratio of doped tin oxide to pigment substrate in the range of 1:4 to about 4:1. Useful pigments have particle size of micrometer (micron) scale, e.g. with a nominal diameter in the range of about 0.05 to 20 microns and more typically about 0.2 to 10 microns and more preferably about 1 to 5 microns.

When the adjuvant material is particulate $TiO_2$—a commonly used pigment material with exceptionally high covering power—it has been found that 6% ATO coated onto $TiO_2$ in the weight ration 2:3 ATO/$TiO_2$ has a CR of 1.2. When the antimony in ATO is increased to about 11 mole percent, the CR is 1.6. A number of ATO coated $TiO_2$ pigments which are commercially available as conductive metal oxide particles having from 1 to about 13% antimony are useful in the displays of this invention. For instance, a light grey conductive powder comprising 12.25% ATO on 0.2 micron $TiO_2$ particles in the weight ratio of 23:77 a light grey powder which is available from Mitsubishi Materials Company Ltd. as W-1 conducting particles. Grey conductive powders comprising 12.3% ATO on 1 to 5 micron $TiO_2$ particles in the weight ratio of 33:77 are available from E.I. Dupont de Nemours and Company under the tradenames "ZELEC®" 1410T and 3410T. Such commercially available materials having a CR of about 1.6. When the antimony is increased to 22 mole percent, the CR is surprisingly increased to a value greater than 2. Thus, one aspect of this invention provides novel ATO coated $TiO_2$ particles having a CR greater than 1.6, e.g. at least about 1.8, more preferably greater than 2.

When other pigments with less covering power than TiO2 are used, e.g. ATO on aluminum borate (at a weight ratio of about 0.5), it has been discovered that doped tin oxide materials with an exceptionally high CR, e.t. up to about 4–5 can be produced. More particularly it has been discovered that certain commercially available conductive powders comprising ATO on pigments such as aluminum borate, barium sulfate zinc oxide, silica and mica, are surprisingly electrochromic.

In particular, a grey conductive powder with a surprisingly high contrast ratio, i.e. greater than 4, is 11.5% ATO on 4 micron aluminum borate particles in the weight ratio of 54:46 available from Mitsui as Passtran 5210 Type V conducting particles.

The doped tin oxide materials of this invention can be obtained from commercial sources or produced by a well-known methods with appropriate adjustment in materials, e.g. dopant level and the amount and nature of adjuvant pigment, for optimal electrochromic effect. For instance, ATO-coated $TiO_2$ according to this invention can be prepared by adding an hydrochloric acid-acidified aqueous solution of antimony trichloride and tin tetrachloride to an aqueous dispersion of $TiO_2$ particles, with simultaneous addition of sodium hydroxide to maintain pH at about 2. This process produces non-conductive metal hydroxide coated $TiO_2$ particles which are converted to conductive, transparent doped tin oxide coated particles when heated at about 600° C. to liberate water.

This invention provides particulate antimony-doped tin oxide that is oxidized or reduced to provide a tin oxide compound that has a powder resistivity which is at least two times the powder resistivity of a base antimony tin oxide compound. Particulate antimony-doped tin oxide is commonly made by thermally treating a mixed antimony and tin compound. Antimony-doped tin oxide can also be prepared by precipitation mixed in oxide particles from a solution of mixed antimony and tin oxide particles followed by thermal treatment at a temperature greater than 500° C. to liberate water and to form particles of base antimony tin oxide compound. The electrical resistivity of base ATO depends on a number of variables, e.g. particle size and level of antimony dopant, and can typically range from 0.05 to 10 ohm-cm. With such a wide range of base powder resistivity it is expected that there can be some overlap with the range of increased resistivity for oxidized or reduced tin oxide compounds. It has been found that the powder resistivity is increased more substantially when the doped tin oxide is reduced rather than oxidized. For instance, as shown in the following examples, a commercial ATO having a powder resistivity of 0.12 ohm-cm can be reduced to provide a powder resistivity of about 5 ohm-cm. With heat treatment the powder resistivity can be returned to a value in the range of the original. When such a base antimony-doped tin oxide is oxidized or reduced there is provided a resistive, particulate antimony-doped tin oxide that is characterized as having a powder resistivity which is at least two times the powder resistivity of said base antimony tin oxide compound.

Preferably such resistive, particulate antimony-doped tin oxide particles will have a nominal dimension in the range of 0.2 to 10 micrometers. Such resistive particulate doped tin oxide being oxidized or reduced will also exhibit desirable electrochromic properties.

When the electrochromic doped tin oxide materials of this invention are used in electrochromic display devices, such materials are typically disposed in a laminate structure, e.g. a layer of electrochromic material in contact with a layer of ion-supplying electrolyte. Alternatively, displays can be fashioned by providing a layer comprising electrochromic particles in a electrolyte matrix. Commonly, an electrical potential is applied across the materials by electrochromic material and electrolyte. Such electric potential causes ions, such as protons, lithium ions or sodium ions, to migrate into or out of the electrochromic material, causing the electrochromic effect-generating reduction or oxidation. Useful electrochromic displays can be prepared using the electrochromic doped tin oxide materials of this invention by following the display fabrication principles set forth in my earlier U.S. Pat. No. 5,413,739 or other principles apparent to those skilled in the art.

This invention also provides electrochromic devices useful for displays. Such devices preferably comprise a layer of electrochromic material in contact with an ion-supplying electrolyte layer. In a preferred embodiment the layer of electrochromic material comprises high contrast, electrochromic, doped tin oxide as disclosed herein and dispersed in a transparent or translucent polymer matrix in an amount such that the material is electrically conductive. The polymer matrix in an amount such that the material is electrically conductive. The polymer of the matrix can comprise any of a variety of common polymers, e.g. preferably a non-brittle polymer such as an tough elastomeric or rubbery polymer such as nitrile rubber, butyl rubber or butyl acrylate, that is amenable to incorporation of dispersed particles of this invention. The polymer matrix can be ionically isolative, e.g. a butyl rubber, or ionically conducting, e.g. a sulfonated polymer such as sulfonated polystyrene or Nafion ionomer. The electrolyte layer is also desirably transparent or, at least, translucent. While the ion-supplying electrolyte material can comprise a salt dissolved in an aqueous or organic solvent-containing polymeric gel, a preferred electrolyte material is an ionically conductive, aqueous polymeric gel which can contain a humectant or hygroscopic filler. Useful hygroscopic material includes deliquescent material such as lithium chloride, calcium chloride, glycerine, sodium dihydrogen phosphate or lithium trifluoromethyl-sulfonate. A preferred aqueous polymeric gel is polyacrylamidomethyl-propanesulfonate, known as POLYAMPS. In such electrochromic devices the electrochromic metal oxide material serves as an electrode for transporting electrons into or out of the ionically conductive electrolyte media. Concurrent with such electron transfer is the movement of ions across an interface between said layer of electrochromic material and said ion-supplying electrolyte layer. In preferred embodiments of this invention the electrodes can be side by side electrodes as disclosed in my earlier U.S. Pat. No. 5,413,739. Such side by side electrodes are located behind, e.g. hidden by, the electrochromic layer of the device.

In order for such electrodes to function, they must be connected to an electrical potential by current feeders, e.g. conductive leads, which can comprise any of a variety of conductive materials such as silver ink, carbon in, metal oxide ink or deposition where the metal oxide is a conductive metal oxide such as ATO. Alternatively, the electrodes can be in a sandwich disposition such that at least one of the electrodes should be of transparent or translucent material to allow observation of the electrochromic effect. Such transparent electrode material is preferably a conductive metal oxide such as ATO. When used as a current feeder, ATO has an optimally high conductivity in the range of 6–10% ATO. When the transparent metal oxide electrode is used in a sandwich type display, the current feeder is typically an integral film coating. It is believed that ATO in a film form, as compared to the particulate doped tin oxide materials of this invention, has such a low contrast ratio as to be considered non-electrochromic; that is, the contrast ratio is less than 1.2.

Bright color to an electrochromic device using metal oxide electrochromics, e.g., Mitsui Passtran 5210, ATO-aluminum borate, by adding non-reactive pigments, such as fluorescent pigments, into a Passtran ink formulation. Fluorescent pigments comprise ground-up organic pigments in a resin base that do not readily react with the other materials included within an electrochromic display and which do not participate in redox reactions at the normal operating voltages of the display, and thus may be considered "inert" for purposes of this specification. The use of fluorescent pigments in this manner causes the background color to be modified from a gray color to a bright color.

An alternative method of using an inert pigment in an electrochromic display device is to deposit ATO (or another suitable electrochromically active, conductive material) on colored pigment substrate particles instead of white substrate particles, e.g., $TiO_2$. For example, ATO can be deposited onto a yellow Ferrocorp $TiO_2$—Ni—Sb pigment and formulated into an ink to give an electrochromic display with a yellow-green background.

Yet another method of adding bright color to an electrochromic device, in an interdigitated electrochromic display, is to provide a light-colored, conductive metal oxide dispersion underneath the active electrochromic composition, such as is shown in FIG. 3. Colored pigments may be introduced into this layer. For example, a colored pigment may be added to a layer of Mitsubishi W-1, white ATO-$TiO_2$. In this case, the electrochromic reaction might be, e.g., bismuth deposition or viologen reduction onto this colored layer. Another example is a colored W-1 layer overprinted with a thin layer of Prussian blue-coated ATO-silica, which may be switched to hide or reveal the colored W-1 layer. Alternately, in the latter example, ATO-coated particles could provide the electrochromic reaction.

Still another way of providing bright color in electrochromic displays is to provide a transparent, yet colored electrolyte, provided that the coloring material is stable to redox cycling of the electrochromic material and nonreactive with respect to the chemicals within the display. Examples of such coloring material include many common commercial food colors. Of course, other stable, soluble, nonreactive pigments may be used instead.

Color in an electrochromic display device may also be enhanced by providing the display with a transparent colored laminating film over the top of the electrolyte.

While the following examples illustrate the preparation and use of various embodiments of the electrochromic doped tin oxides and electrochromic displays of this invention, it should be clear from the variety of the examples herein that there is no intention of so limiting the scope of the invention. On the contrary, it is intended that the breadth of the inventions illustrated by reference to the following examples will apply to other embodiments which would be obvious to practitioners in the electrochromic arts.

EXAMPLE 1

This example illustrates one embodiment of an electrochromic device according to this invention using commercially available ATO coated $TiO_2$ particles. 1.5 grams (g) of light grey conductive powder comprising 12.25% ATO on 0.2 micron $TiO_2$ particles in the weight ratio of 23:77 from Mitsubishi Materials Company Ltd and identified as W-1 conducting particles was dispersed in 5 g of a 10% solution of styrene-butadiene-styrene (SBS) rubber in toluene. A copper coated polyester film was used as a electrode substrate. The dispersion was coated as a film onto the copper layer and dried with a heat gun to evaporate the toluene solvent. The coated substrate was immersed in an aqueous electrolyte solution comprising 5% sodium sulfate. With the application of 1 to 2 volts, the coating turned a visibly darker grey color than the original color of the coating. Reversing the polarity cause a rapid reversal to a lighter grey color that was visibly lighter than the original color of the coating.

EXAMPLE 2

This example illustrates the fabrication of an electrochromic display device. A first display conductor patter was printed in the shape of a 25 millimeter (mm) square centered on a supporting substrate of polyester film with a narrow conductor lead running from the 25 mm square to the edge of the polyester substrate. A counter electrode conductor was printed in the shape of a 12 mm wide line bordering the square pattern and lead at a distance of about 1 millimeter from the edge thereof. Each conductor pattern was printed with a conventional silver ink and coated with a conventional carbon ink. An electrochromic display was fabricated by overcoating the conductor pattern with a dispersion of 12% ATO-coated $TiO_2$ in a solution of fluorinated elastomer; the 12% ATO-coated $TiO_2$ was obtained from Mitsubishi Materials Company Ltd. and is characterized as light grey conducting powder having a particle size of 0.2 micron with ATO and $TiO_2$ present in the weight ratio of 23:77. The fluorinated elastomer was dissolved at 22 weight percent (wt %) in butoxyethyl acetate. Sufficient ATO coated powder was dispersed in the elastomer solution so that the weight ratio of ATO-coated powder to elastomer was 2.5:1. The conductor pattern was coated with the dispersion except for the lead portions thereof at the edge of the substrate where electrical connections could be made. The dispersion coating was dried at 130° C. for 10 minutes, recoated with dispersion and redried to provide an electrically conducting, essentially pin hole-free coating of light grey-colored, electrochromic, doped tine oxide particles dispersed in a transparent, tonically insulating elastomer matrix, designated as a "basic ATO-coated display element". The electrochromic layer of the basic ATO-coated display element was covered with a stack of adhesive polyester gaskets to provide an electrolyte well over the electrode area; the well was about 1 millimeter (mm) in depth and was filled with electrolyte comprising an aqueous solution of 30 wt % lithium chloride and 5 wt % acrylic polymer thickener, i.e. Acrysol ASE-95 from Rohm and Haas Company. The electrolyte filled well was sealed with adhesive polyester film to complete the construction of electrochromic display device designated D1.

EXAMPLE 3

This example illustrates the measurement of contrast ratios for an electrochromic doped tin oxides operating in an electrochromic effect-generating environment. The conductor leads of the electrochromic display device D1 prepared in Example 2 were connected to a function generator which applied a 50 milliHertz, ±1.5 volt square wave potential to drive the electrochromic device causing the electrochromic ATO-coated particles visible through the electrolyte coating to cycle between a light grey and a dark grey color as the ATO was sequentially oxidized and reduced. The magnitude of the contrast ratio of the color change was determined by fitting the device under a microscope fitted with a Melles-Griot photodiode wide band width amplifier. The electrochromic, 12% ATO-containing material in the device exhibited a contrast ratio of 1.38.

EXAMPLE 4

This example illustrates the dramatic effect of an increased amount of antimony in electrochromic properties of ATO. A basic ATO-coated display element prepared according to Example 2 was coated with additional electrochromic dispersion and fabricated into an electrochromic display in essentially the same manner of Example 2 except for the use of 33% ATO. The contrast ratio measured in the manner of Example 3 was 1.92.

EXAMPLE 5

This example further illustrates the dramatic effect of an increased amount of antimony in electrochromic properties of ATO. A set of basic ATO-coated display elements prepared according to Example 2 were coated with an additional electrochromic dispersion and fabricated into an electrochromic display in essentially the same manner of Example 2 except that the doped tin oxide comprised antimony in the range of 11 to 60 percent and that the ATO and $TiO_2$ were in the weight ratio of 36:64. The contrast ratio measured in the manner of Example 3 is reported in Table 1.

TABLE 1

| % Sb | CR |
| --- | --- |
| 5.7 | <1.2 |
| 11 | 1.6 |
| 23 | 2.0 |
| 33 | 2.14 |
| 43 | 2.19 |
| 47 | 2.17 |
| 55 | 1.74 |
| 60 | 1.94 |

EXAMPLE 6

This example illustrates the dramatic increase in electrochromic effect achieved by selection of substrate pigment. An ATO-coated display element prepared similar to the procedure of Example 2 was further coated with an electrochromic dispersion of 12% ATO-coated onto aluminum borate (obtained from Mitsui as Passtran 5210 conductive powder) in a fluorocarbon elastomer solution. In the dried electrochromic top coat the weight ratio of ATO-particles containing particles to fluorocarbon elastomer was 28:15. An electrochromic device prepared as in the manner of Example 2 and evaluated in the manner of Example 3 showed that the doped tin oxide on an aluminum borate substrate had a contrast ratio of 5.14.

EXAMPLE 7

This example illustrates the preparation of an electrochromic, niobium-doped tin oxide according to this invention. A barium sulfate slurry was provided by dispersing 50 g of barium sulfate powder in 750 ml of water and heating to 75° C.; the slurry was adjusted to pH 12 with 25% sodium hydroxide solution. A tin oxide solution (98.5 g of sodium stannate trihydrate in 250 ml of water at 75° C.) was added to the slurry. After stirring for 30 minutes, an acidic niobium solution (0.735 g niobium trichloride in 25 ml methanol acidified with 270 cc of 20% sulfuric acid) was added to the tin oxide-containing slurry over a 90 minute period. The pH of the niobium/tin-containing slurry was adjusted to 2.5 with 20% sulfuric acid. After 3 hours the solution was cooled and filter washed 10 times with 250 ml of water, providing particles that were dried in a vacuum oven at 130° C. The dried particles were calcined for 2 hours under nitrogen at 450° C. to provide electrochromic 0.72% niobium-doped tin oxide coated barium sulfate substrate particles having a contrast ratio of 1.54.

EXAMPLE 8

This example illustrates the utility of mixtures of doped tin oxide particles and pigment particles as an electrochromic material. A mixture of 0.4 g of 13.4% ATO particles (commercially available from DuPont as "ZELEC®" 3010XC ATO) and 0.15 g of $TiO_2$ particles was dispersed in 1 g of 22 wt % fluoroelastomer solution in butoxyethyl acetate to provide a dispersion suitable for use in an electrochromic display as described herein. The material exhibited a contrast ratio of 2.4.

EXAMPLE 9

This example illustrates the high resistance of oxidized or reduced doped tin oxide particles according to this invention. ZELEC 35005XC ATO obtained from DuPont was determined to have a base ATO powder resistivity of 0.12 ohm-cm. The base ATO was treated with sodium borohydride, washed and dried to provide reduced ATO (having 0.58% sodium ions) having a powder resistivity of 404 ohm-cm. The base ATO was treated with ammonium persulfate to provide oxidized ATO having a powder resistivity of 5.5 ohm-cm. When the oxidized ATO is heated, the powder resistivity returns to a value close to 0.1 ohm-cm.

EXAMPLE 10

A sample of ATO-alumina (75% ATO plus 25% alumina, the ATO consisting of 43% molar Sb-V and 57% molar Sn-IV) was mixed with a neon red "DAYGLO®" pigment in a weight ratio of 4 parts ATO to 1 part pigment. The mixture was then formulated into an ink with fluoroelastomer binder in the usual way (i.e., by mixing 2.5 parts by weight of the mixture with 1 part by weight of fluoroelastomer binder), coated over test electrodes, and then covered with aqueous lithium chloride electrolyte. Upon applying ±31.5 volts to the test electrodes, the working electrode changed from red to dark gray. This experiment was repeated using strong yellow "DAYGLO®" pigment rather than neon red, which resulted in the working electrode being changed from bright yellow (rather than red) to dark gray.

EXAMPLE 11

Prussian blue on duPont ECP1703S (ATO on hollow silica shells of 9 micron average particle size, containing 65 wt. % ATO, which itself is 3.8 mole % Sb and 96.2 mole % Sn and 35 wt. % silica) made into ink using Acheson Colloids SS24932 fluoroelastomer binder was mixed with various inert fluorescent pigments. The resulting ink was drawn onto Mitsubishi W-1 squares and coated with aqueous KCl electrolyte and switched. It was found that the resulting devices provided startling visual effects, generally changing from a dark color to a very bright color. Specifically, when "HIVIZ®" (Lawter, Int., Northbrook, Ill.) TS13 red pigment was mixed into the ink, the resulting electrochromic device switched from dark violet to bright rose; when "HIVIZ®" TS44 yellow pigment (Lawter, Int.) was mixed into the ink, the resulting device switched from dark green to bright yellow; and when "HIVIZ®" TS14 orange pigment (Lawter, Int.) was mixed into the ink, the resulting device switched between chocolate and orange, brown and orange, or blue-gray and tan, depending upon the relative amount of TS14 that was used.

It was observed, however, that initially the resulting devices switch slowly and require overnight switching for best results. ("Overnight switching" is repeated cycling of the display at ±1.0 volt, for example, at 50 milliHertz, to allow the electrolyte to better penetrate the electrode coating, and thus provide more effective switching.)

EXAMPLE 12

A sample of ATO substrate was prepared in accordance with the method described above in Example 2, except that the substrate particle was Ferrocorp V-9412 yellow $TiO_2$-based pigment. The sample contained 36% ATO (47% Sb-V, 53% Sn-IV) and was fired at 600° C. for 3 hours. Powder resistivity was measured at 11.2 ohm-cm at 12,000 psi, and when formulated into an ink by adding the ATO-coated particles to an elastomer solution as in Example 2, using the same weight ratios, an electrochromic display made from this ink switched from light lemon yellow to dark gray at ±1.5 volts DC.

EXAMPLE 13

An orange ink was prepared by mixing 2 parts by weight duPont ECP1703S ink with 1 part by weight "HIVIZ®" TS14 ink. Each of these inks had been prepared by mixing 2.5 parts by weight of pigment with 1 part by weight Acheson Colloids SS24932 fluoroelastomer binder. The mixed ink was coated onto W-1 squares using a 3 mil drawbar. The samples were dried at 130° C. for 15 minutes. The orange samples were used to make "shutter" displays.

One of the displays was coated with 1 mil of 1 part by weight Acheson PD008 (particles of 75% ATO and 25% silica, with 43 mole % Sb and 57 mole % Sn) mixed with 1 part by weight Acheson Colloids SS24932 binder solution, dried and covered with a 25% LiCl/5% ASE polyacrylic (Rohm & Haas) electrolyte. On switching at ±1.0 volt, the active area switched from dark gray to bright orange. This was caused by the ATO top coat masking the orange layer underneath when in the dark state. On the other hand, when the ATO top coat was in the light state, it was sufficiently transparent to allow viewing of the underlying orange surface.

A similar result was obtained by coating the orange surface with a 1 mil coat Prussian blue ink made by mixing 1 part by weight Acheson PD007 (which is Prussian blue on ECP1703S, already formulated with Acheson Colloids SS24932 fluoroelastomer binder at 1:1 pigment:binder ratio) mixed with 1 part by weight of additional SS24932. The dried sample was covered with a saturated solution of KCl and switched at ±1.0 volt. The blue Prussian blue state masked the orange surface. However, when the Prussian blue was in its white state, the orange underlying surface was visible. Thus, the active area switched from blue to orange.

One of the orange samples was covered with a $BiCl_3$-containing electrolyte. On switching to −4.5 volts, the bismuth metal plated onto the orange surface, covering it and making it appear black. On reversing the polarity, the metallic bismuth was dissolved, thereby causing the orange surface to reappear. Thus, the active area switched from orange to black.

EXAMPLE 14

Two drops of McCormick yellow food coloring, a common type typically found in grocery stores, was added to 10 grams of aqueous solution of 25% LiCl/5% ASE-95 polyacrylate. The resulting mixture was spread on a printed one-inch test square electrode that had been coated with DuPont-55 ATO-silica ink. Upon applying ±1.5 volts DC, color changes from black to yellow were obtained, the yellow coloring being due to the food coloring.

EXAMPLE 15

A printed Prussian blue test square with saturated KCl electrolyte was switched from white to blue at ±1.3 volts. A transparent neon pink-colored film (Roscolux #343) was overlaid onto the test square, causing the apparent color switch to be from deep purple to neon pink.

While specific embodiments have been described herein, it should be apparent to those skilled in the art that various modifications thereof can be made without departing from the spirit and scope of the invention. By way of illustration only, it will be recognized that the pigments given by way of illustration are not the only such pigments that may be used to practice the invention, and that mixtures of pigments to obtain additional colors and color effects fall within the scope of this invention. Furthermore, the fact that each alternative method has been explained by way of separate example should not be interpreted as excluding the possibility of using more than one of the methods in a single display device. By way of example only, a colored film may be used to overlay an electrochromic device that contains a transparent pigment dissolved in the display's electrolyte. Other combinations are possible, and pigment colors can be chosen to provide varied color effects.

Accordingly, the scope of the invention should be determined with reference to the claims below, and should not be construed as limited to the particular examples that are presented by way of explanation only.

What is claimed is:

1. A method of enhancing color displayed by an electrochromic display comprising the steps of:

mixing at least one inert pigment comprising an organic pigment with an electrochromically active substance; and coating the resulting mixture onto an electrode of an electrochromic display.

2. The method of claim 1, wherein the inert pigment further comprises a resin base.

3. A method of enhancing colors displayed by an electrochromic display comprising the steps of:

mixing an inert pigment with a binder and an electrochromically active material comprising antimony-doped tin oxide to form an ink; and coating the resulting mixture onto an electrode of the electrochromic display.

4. A method of enhancing colors displayed by an electrochromic display comprising the steps of:

mixing a fluorescent inert pigment with an electrochromically active substance; and coating the resulting mixture onto an electrode of the electrochromic display.

5. A method of enhancing colors displayed by an electrochromic display comprising the steps of:

mixing an inert pigment with an electrochromically active substance comprising Prussian blue and a binder to form an ink; and coating the resulting mixture onto an electrode of the electrochromic display.

6. A method of enhancing colors displayed by an electrochromic display comprising the steps of:

depositing an electrochemically active, conductive material comprising antimony-doped tin oxide on an inert $TiO_2$—Ni—Sb pigment to form coated pigment particles;

firing the coated substrate particles at 600° C. for three hours; and coating the fired substrate particles on an electrode of the display.

7. A method of enhancing colors displayed by an electrochromic display comprising the steps of:

depositing an electrochromically active, conductive material on $TiO_2$-based, colored, inert pigment substrate particles to form coated pigment particles containing 36 wt % of antimony-doped tin oxide; and coating the coated pigment particles on an electrode of a display.

8. A method of enhancing colors displayed by an electrochromic display comprising the steps of:

coating a mixture of the inert pigment and a light-colored, conductive material over an electrode of the display to form a first layer; and coating an electrochromically active layer above the first layer, so that a visibility of the first layer is dependent upon an oxidation state of the electrochromically active layer.

9. The method of claim 8, wherein the light-colored, conductive material comprises a metal oxide.

10. The method of claim 9, wherein the light-colored, conductive material comprises antimony-doped tin oxide and $TiO_2$.

11. The method of claim 8, wherein the electrochromically active layer comprises Prussian blue.

12. A method of enhancing colors displayed by an electrochromic display, comprising the steps of:

coating a mixture of the inert pigment and a light-colored, conductive material over an electrode of the display to form a colored layer; and covering the colored layer with an electrolyte containing a dissolved ion that is removed from solution to form an opaque coating over the colored layer when a first polarity of electric charge is applied to the electrode, and that redissolves upon application of an opposite electric charge to the electrode.

13. The method of claim 12 wherein the electrolyte comprises a soluble bismuth salt.

14. A method of enhancing colors displayed by an electrochromic display comprising the step of:

dissolving transparent, inert coloring matter in a liquid electrolyte solution of the display.

* * * * *